Feb. 26, 1952  M. WEISS ET AL  2,587,556
APPARATUS FOR PREPARING CONCENTRATES
Filed July 11, 1947
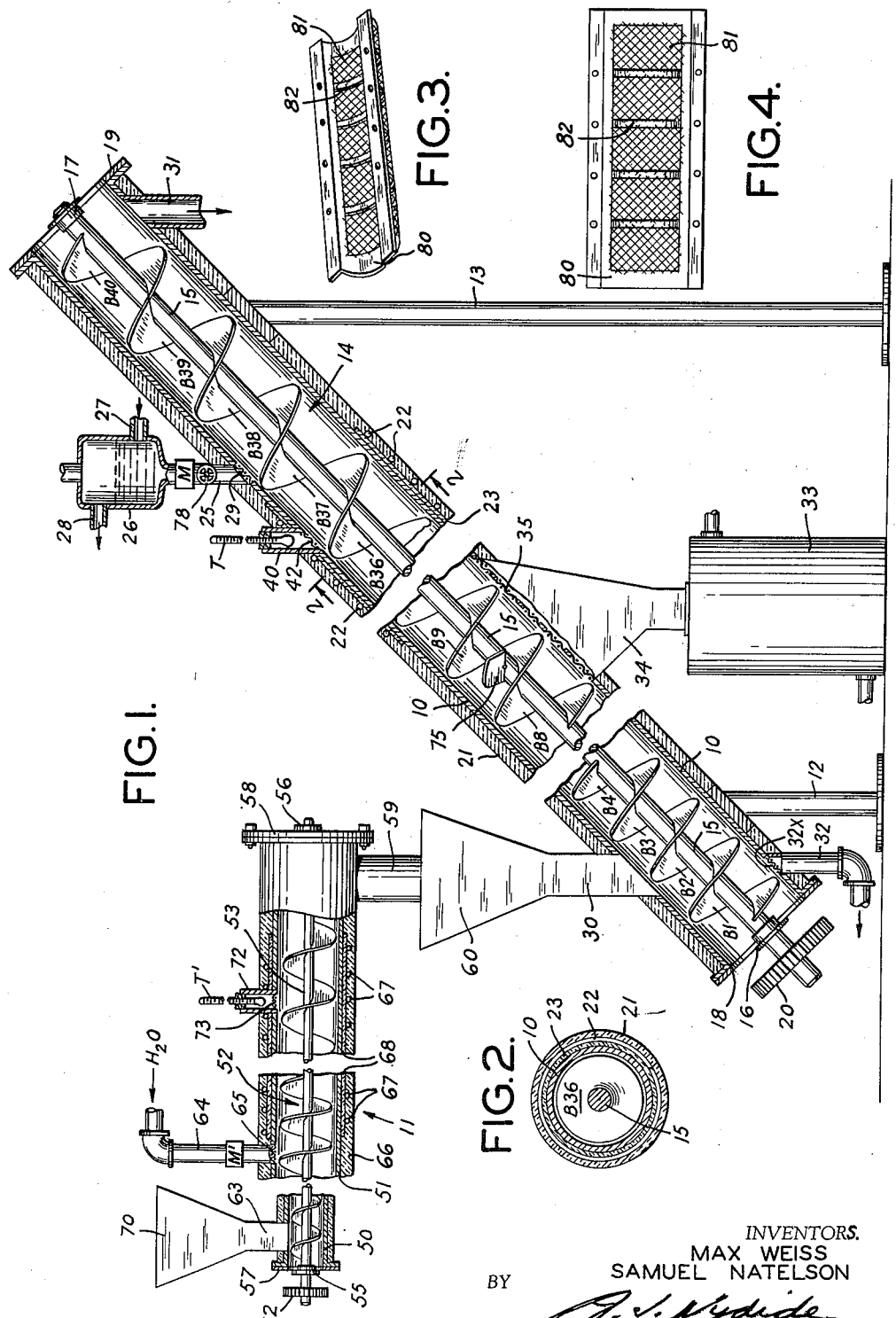
INVENTORS.
MAX WEISS
SAMUEL NATELSON
BY
ATTORNEY.

Patented Feb. 26, 1952

2,587,556

UNITED STATES PATENT OFFICE 2,587,556

APPARATUS FOR PREPARING
CONCENTRATES

Max Weiss and Samuel Natelson, Brooklyn, N. Y.

Application July 11, 1947, Serial No. 760,208

13 Claims. (Cl. 99—289)

1

This invention relates to the preparation of high concentrations of solvent extractable factors, and in particular is directed to a continuous process for effectuating such preparations, as for example, the preparation of a high concentrate of coffee and apparatus for carrying out such continuous process.

For many years the workers in the coffee art have sought to provide a coffee concentrate which, upon the addition of water or milk, would result in a beverage having the full-bodied taste and aroma of the freshly brewed beverage. Despite the numerous efforts of many workers in this field, none has provided the art with a truly satisfactory concentrate. One of the major difficulties is due to the fact that the aromatic bodies of the roasted coffee bean are exceedingly sensitive to chemical change which takes place with great rapidity. Furthermore, these bodies are extremely volatile and therefore are rapidly lost in the processing operations. The non-volatiles are also sensitive to chemical changes.

This invention has as one of its principal objects the provision of means for the continuous preparation of a coffee concentrate which more closely than any other heretofore known approaches the ideal product sought by those skilled in this art.

A further object is to provide the extraction art with an apparatus which affords a highly improved means for the continuous prepartion of coffee concentrates as well as many other concentrates.

These objects, as well as others which will become apparent from the description of the invention, are attained, in the case of coffee, by extracting the ground bean with water at a controlled temperature in such a way that the ultimate product is a concentrate of high solids content and dissolved volatiles in proportions matching that of a beverage freshly prepared from the ground, roasted bean. The extraction is effectuated by using the minimum amount of hot water required to achieve maximum extraction and is carried out by a continuous operation wherein a stream of finely ground, roasted bean is moved through a counter-flowing stream of extracting medium.

The invention will be more clearly understood from the following description in conjunction with the accompanying drawings wherein:

Fig. 1 is a diagrammatic illustration in cross-section partially shortened, of a form of apparatus for carrying out the continuous extraction.

Fig. 2 is a cross-section of the structure illustrated in Fig. 1 taken on the line 2—2 thereof.

Fig. 3 is a perspective view of a replaceable screen forming a section of the cylinder in which the extraction is carried out.

Fig. 4 is a bottom view of the screen shown in Fig. 3.

Before explaining in detail the present invention, it is to be understood that the invention is not limited in its application to the details of the process or the construction and arrangement of parts illustrated in the accompanying drawings, since the invention is capable of other embodiments and of being practiced or being carried out in modified ways. Also, it is to be understood that the phraseology or terms employed herein is for the purpose of description and not of limitation and it is not intended to limit the invention claimed herein beyond the requirements of the prior art.

A suitable apparatus for use in the practice of the invention is illustrated in the accompanying drawings and comprises a cylinder 10 made, for example, of stainless steel, aluminum or any other appropriate material resistant to corrosion or other chemical reaction and, if desired, a pretreater 11. The cylinder 10 may be mounted angularly being adequately suspended or supported as by the standards 12 and 13. A continuous flight conveyor 14 made, for example, of stainless steel, aluminum or any other appropriate material resistant to corrosion or other chemical reaction, is housed within the cylinder 10. The flight conveyor is provided with a shaft 15 journaled as in the bearings 16 and 17 mounted within closure plates 18 and 19. Rotation of the shaft 15 is attained by a driving mechanism, not shown, appropriately connected therewith as by the gear 20. The conveyor 14 is provided with three different pitches, the magnitude of such variation and the reason therefore being hereinafter explained. The cylinder 10 may be provided with an insulating cover 21 as well as means for heating the same, as for example, by an electrical resistance coil 22, the latter being separated from the cylinder by an appropriate dielectric 23. The cylinder 10 is also provided with a liquid feed spout 25 appropriately connected to a meter M and a liquid levelling member 26. The member 26 is provided with an inlet pipe 27 and an overflow pipe 28. At the base of the feed spout 25 there is a screen 29. A solids supply pipe 30 provides means for charging the cylinder with a supply of the material to be subjected to the extraction. A solids discharge pipe 31 provides means for removal of the exhausted solids.

At the base of the cylinder is a clean-out pipe 32 screened as at 32x. A receiver 33 for the concentrate, is connected to the cylinder 10 as by the funnel 34, the same being appropriately screened as by the screen 35. To regulate the temperature within the cylinder 10 the apparatus may be provided with thermometer T set within the well 40, the base of which is appropriately screened as at 42. A thermometer, not shown, measures the temperature of the concentrate coming through the funnel 34.

The pretreater or prewetter apparatus comprises a bisectional cylinder having a section 50 of small diameter and a second section 51 of larger diameter. A flight conveyor 52 having a shaft 53 is journaled as in bearings 55 and 56 mounted respectively in the closure plates 57 and 58. A delivery pipe 59 is connected to the cylinder 51 and leads into the funnel 60 connected with the solids supply pipe 30. The shaft 53 is rotated by a driving mechanism, not shown, appropiately connected thereto as by the gear 62. Solids are supplied to the section 50 by the solids supply pipe 63. A liquid supply pipe 64, appropriately connected with a meter M' is connected with the section 51, the same being appropriately screened as at 65. The pretreater may be provided with an insulating cover 66 and heating means, as for example, an electrical resistance coil 67, the latter being separated from the section 51 by an appropriate dielectric 68. A thermometer T' set within a thermometer well 72 appropriately screened as at 73 provides means for regulating the temperature within this zone of the pretreater.

In carrying out the continuous extraction process, finely divided roasted coffee is fed from the funnel 70 through the pipe 63 into the section 50 of the pretreater. With the shaft 53 rotating, the ground coffee advances into the section 51 until it comes into contact with a regulated stream of hot water delivered in metered amount through the pipe 64. The dry coffee is wetted by the inflowing water and expands in volume. For this reason the pitch of the blade is increased so as to accommodate that expansion in its final passage through the pretreater. The further increase in the pitch of the conveyor allows the mass of expanded coffee to diminish in compactness and thereby to increase its porosity so that it will readily flow into the extractor. At this stage of the operation the coffee is warmed and merely moistened in an amount sufficient to be absorbed and still to remain substantially dry as it is fed into the funnel or hopper 60.

From the hopper the pretreated grounds move into the cylinder 10 near the base thereof and from that point are continuously moved forward by the rotating conveyor 14; subjected to the extraction; and the exhausted spent grounds are finally discharged through the pipe 31. A continuous supply of water of high temperature is fed into the upper portion of the cylinder 10 through the liquid feed spout 25, the quantity thereof being controlled by the meter M and valve 78. During the course of the counter-current movement of the stream of rising coffee and the descending column of water, there is achieved maximum extraction of the solubles at the region of the funnel 34 which leads into the receiver 33 for the concentrate. The conveyor 14 is provided with blades of three sets of pitches for the following reasons. At the base of the conveyor the pitch is such that the ground coffee will completely fill the cylinder so as to provide an effective barrier against the descending stream of liquid. This region of the cylinder may be designated as the dry zone and is achieved by a uniform pitch for the first six turns (B1 to B6) of the screw, the pitch being about one-half the diameter of the worm. The following ascending four turns (B7–B10) of the conveyor have a pitch of approximately one and one-half times the pitch of the first six flights, these four flights being positioned at the concentrate discharge zone. The following ascending turns (B11–B40) of the flight have a pitch of about twice that of the first six turns of the worm. Beginning at a point in the concentrate removal zone the shaft of the flight is provided with a plurality of retarders 75 placed, for example, at the 10th, 12th, 15th, 18th and 25th turns of the flight. The retarders may have a height of about one-half that of the blade and a width of about one-half that of the pitch. The function of the retarders is to pack the coffee into a continuous porous helical column so as to obtain maximum concentration of the extractables in the solution.

We have found that the cylinder 10 should be mounted angularly in order to achieve the proper head of the extracting liquid. The angle may be as low as 15°, but preferably the best results are obtained above 30°. As the angle is increased the load on the conveyor is increased. A balance must be achieved between minimum load and maximum head. This balance is favorable at approximately 45°. Further increase of the angle causes an accelerated increase in load with a decelerated increase in head. For example, the head is measured by the sine of the angle. The sine of 45° is 0.714. The sine of 90°, the maximum angle, is 1.0. Therefore, doubling of the angle from 45° produces an increase in head of only 29%. In practice the cylinder 10 of the extractor is mounted at an angle of 45°.

An important feature of this invention is the inclusion of a screen as part of the cylinder at the concentrate discharge zone. This screen is so positioned as to form a replaceable section of the cylinder aligned with the inner surface of the cylinder. In this position the screen is constantly swept by the rotating flight conveyor. This is extremely essential. If the screen is not continuously swept the grounds will quickly clog the openings and prevent the concentrate from passing into the receiver.

As illustrated in Figs. 3 and 4, the screen assemblage comprises the arcuately shaped member 80, and a screen 81 of appropriate mesh, the latter being supported, if desired, by the ribs 82, so as to provide rigidity of the screen surface for thorough sweeping by the rotating blades of the conveyor. Member 80 may be fastened to the cylinder 10 by being hinged thereto and appropriately clamped or bolted, or alternatively by bolting or clamping similar to the positioning of a man-hole cover.

It will be observed that the upper height of the liquid level is adjusted so that no water will flow into the solids discharge pipe 31.

The temperature of the extractor is regulated by reading the thermometers hereinabove described, or by any other convenient means for thermometric registration and the temperature may be controlled by appropriate regulation of the heating element described, or any other suitable arrangement. The function of the pretreatment is to enable the operator to use finely ground coffee in order to achieve maximum extraction. In operation it has been found advantageous to use from 100 to 300 cc. of water per pound of ground coffee bean being pretreated. Such amount of water is merely absorbed by the ground coffee, as a result of which it swells the coffee making it more porous, thereby preventing jamming during the solvent extraction in the cylinder 10. In addition, it initiates the solubilizing of the coffee solubles.

The temperature of the water may be maintained, if desired, in the neighborhood of 100° C. and it is possible to carry out the continuous operation within a temperature range of from 70° C. to 100° C. In operation it is possible to achieve a concentrate having a solids content of from 20% to 40%.

Approximately 400 to 800 cc. of water are used to extract one (1) pound of coffee which has been pretreated as described above. Approximately 300 cc. of water per pound of coffee are retained in the spent grounds which emerge from the pipe 31. A suitable speed for the rotation of the conveyor 14 is approximately 20–40 revolutions per minute. The time of transit of the coffee through the extracting zone, i. e., from the concentrate discharge screen to the pipe 25 is approximately 3–7 minutes.

It is essential, on completion of a continuous run, say at the end of a working day, that the extractor be thoroughly cleaned so as to remove residues which tend to undergo decomposition. Such decomposition products, if allowed to remain, would spoil the concentrate prepared on the next run of the apparatus. The cleaning is accomplished by flushing the apparatus without dismantling the same. This is done by using a stream of hot water, followed, if desired, by a current of steam, allowing the waste grounds in the apparatus to exit through the pipe 32 after removing the screen 32x.

Among the many advantages of this invention may be noted the following:

The entire unit may be sealed, thereby obviating loss of the essential, highly volatile constituents of the ground coffee; the extraction may be effectuated at a temperature of 70° C. or higher, that is at points above the pasteurizing temperature; the extraction may be carried out at high speeds; and with a minimum of water. This is in striking contrast with the present art. By this invention, the coffee is in contact, under constant agitation, with the extracting fluid for a controlled amount of time, and at a controlled temperature adequate for the complete extraction of the desired solubles, but not for such a period of time as to extract the undesirable solubles which impart bitter taste and objectionable flavor. The apparatus affords means for carrying out a markedly efficient process as evidenced by the fact that the spent grounds, when tested for residual desirable constituents, show practically no desirable extractables. The ultimate concentrate is therefore a product having a very high solids content which is sterile. It is a product of high fidelity. One teaspoonful or less thereof will produce a cup of coffee.

Since the concentrate is a sterile product it may be packed directly for home use or, in the alternative, sugar may be added thereto to make the solids content 50–75% and the same vacuum packed. Furthermore, the concentrate or the concentrate with the sugar added may, without further concentration, be spray dried to yield a powder of unusually fine quality which can be used for the preparation, by the addition of boiling water, of an instant beverage.

Furthermore, the apparatus is one of extreme simplicity for carrying out continuous operations. It has but a minimum of parts which may be readily removed or easily reached for repairs when needed. The apparatus occupies but relatively little space.

It is also to be noted that there is but a minimum of heat loss as the caloric input is used entirely for achieving maximum extraction and maintaining the extract sterile. The apparatus and the process are adaptable for use with French or Italian roasts as well as any other shades.

A further marked advantage of the apparatus is that it may be adapted for the continuous extraction of the vanilla bean with alcohol; the extraction of tea with water; the extraction of crushed botanicals for the recovery or concentration of their medicinal or other active contents, as for example, roots, stems, leaves, flowers, ground barks, and the like, such as the extraction of pyrethrins from chrysanthemum flowers, morphine from poppy, quinine and the related alkaloids from the cinchona bark, etc.; the extraction of allergens from ground peanuts, dust, pollen, etc. If desired, the extraction of the coffee may be carried out in an atmosphere of nitrogen. The apparatus being a sealed unit is therefore readily adaptable for operation under such conditions.

Although the receiver may be adapted to operate under vacuum, it is preferable not to use reduced pressure in the preparation of the coffee concentrate so as to avoid any loss of the essential volatiles.

We claim:

1. Apparatus for the continuous extraction from solids of liquid solubles of high concentrations and uniform composition comprising: a stationary cylinder; a rotatable screw conveyor housed within the cylinder; a solids supply pipe connected to the cylinder near the base thereof; a solids discharge pipe connected to the cylinder near the head thereof; a liquid supply pipe connected to the cylinder near the head thereof, said supply pipe being connected with means for supplying the liquid at constant pressure and at constant temperature; a porous section located on the underside of the cylinder and positioned near the bottom thereof, the said porous section being of mesh sufficient to retain the said solids, the said section being swept by the screw conveyor, and said porous section being spaced from the solid supply pipe forwardly thereof whereby the solids are maintained in a dry zone anteriorly of said porous section; a liquid discharge pipe connected with the porous section; and means for maintaining the cylinder at a constant temperature.

2. Apparatus in accordance with claim 1, including in combination therewith a pre-treater for pre-swelling the material to be extracted comprising: a cylinder; a rotatable screw conveyor housed within said cylinder; a solids supply pipe connected to the cylinder near the base thereof; a liquid supply pipe connected to the cylinder adjacent the position of connection of the solids supply pipe with the cylinder; and a discharge pipe connected to the cylinder near the head thereof.

3. Apparatus for the continuous extraction from solids of liquid solubles of high concentration and uniform composition comprising: a stationary cylinder mounted at an angle; a rotatable screw conveyor housed within the cylinder; a solids supply pipe connected to the cylinder near the base thereof; a solids discharge pipe connected to the cylinder near the head thereof; a liquid supply pipe connected to the cylinder near the head thereof, said supply pipe being connected with means for supplying the liquid at constant pressure and at constant temperature; a porous section located on the underside of the cylinder and positioned near the bottom thereof, the said porous section being of mesh sufficient to retain the said solids, the said section being swept by the screw conveyor, and said porous section being spaced from the solid supply pipe forwardly thereof whereby the solids are maintained in a dry zone anteriorly of said porous section; a liquid discharge pipe connected with the porous section; and means for maintaining the cylinder at a constant temperature.

4. Apparatus in accordance with claim 3, including in combination therewith a pre-treater for pre-swelling the material to be extracted comprising: a cylinder; a rotatable screw conveyor housed within said cylinder; a solids supply pipe connected to the cylinder near the base thereof; a liquid supply pipe connected to the cylinder adjacent the position of connection of the solids supply pipe with the cylinder; and a discharge pipe connected to the cylinder near the head thereof.

5. Apparatus for the continuous extraction from solids of liquid solubles of high concentration and uniform composition comprising: a stationary cylinder mounted at an angle of at least 30 degrees; a rotatable screw conveyor housed within the cylinder; a solids supply pipe connected to the cylinder near the base thereof; a solids discharge pipe connected to the cylinder near the head thereof; a liquid supply pipe connected to the cylinder near the head thereof, said supply pipe being connected with means for supplying the liquid at constant pressure and at constant temperature; a porous section located on the underside of the cylinder and positioned near the bottom thereof, the said porous section being of mesh sufficient to retain the said solids, the said section being swept by the screw conveyor, and said porous section being spaced from the solid supply pipe forwardly thereof whereby the solids are maintained in a dry zone anteriorly of said porous section; a liquid discharge pipe connected with the porous section; and means for maintaining the cylinder at a constant temperature.

6. Apparatus in accordance with claim 5, including in combination therewith a pre-treater for pre-swelling the material to be extracted comprising: a cylinder; a rotatable screw conveyor housed within said cylinder; a solids supply pipe connected to the cylinder near the base thereof; a liquid supply pipe connected to the cylinder adjacent the position of connection of the solids supply pipe with the cylinder; and a discharge pipe connected to the cylinder near the head thereof.

7. Apparatus for the continuous extraction from solids of liquid solubles of high concentration and uniform composition comprising: a stationary cylinder mounted at an angle of at least 30 degrees; a rotatable screw conveyor housed within the cylinder; a solids supply pipe connected to the cylinder near the base thereof; a solids discharge pipe connected to the cylinder near the head thereof; a liquid supply pipe connected to the cylinder near the head thereof, said supply being connected with means for supplying the liquid at constant pressure and at constant temperature; a removable porous section located on the underside of the cylinder and positioned near the bottom thereof, the said porous section being of mesh sufficient to retain the said solids, the said section being swept by the screw conveyor, and said porous section being spaced from the solid supply pipe forwardly thereof, whereby the solids are maintained in a dry zone anteriorly of said porous section; a liquid discharge pipe connected with the porous section; and means for maintaining the cylinder at a constant temperature.

8. Apparatus in accordance with claim 7, including in combination therewith a pre-treater for pre-swelling the material to be extracted comprising: a cylinder; a rotatable screw conveyor housed within said cylinder; a solids supply pipe connected to the cylinder near the base thereof; a liquid supply pipe connected to the cylinder adjacent the position of connection of the solids supply pipe with the cylinder; and a discharge pipe connected to the cylinder near the head thereof.

9. Apparatus for the continuous extraction from solids of liquid solubles of high concentration and uniform composition comprising: a stationary cylinder mounted at an angle of at least 30 degrees; a rotatable screw conveyor housed within the cylinder; a solids supply pipe connected to the cylinder near the base thereof; a solids discharge pipe connected to the cylinder near the head thereof; a liquid supply pipe connected to the cylinder near the head thereof, said supply pipe being connected with means for supplying the liquid at constant pressure and at constant temperature; a removable porous section located on the underside of the cylinder and positioned near the bottom thereof, the said porous section being of mesh sufficient to retain the said solids, the said section being swept by the screw conveyor, and said porous section being spaced from the solid supply pipe forwardly thereof, whereby the solids are maintained in a dry zone anteriorly of said porous section; a liquid discharge pipe connected with the porous section; and means for maintaining the cylinder at a constant temperature.

10. Apparatus in accordance with claim 9, including in combination therewith a pre-treater for pre-swelling the material to be extracted connected to the aforesaid cylinder, the pre-treater comprising a bi-sectional cylinder having different diameters; a rotatable screw conveyor housed within said cylinder, the screw conveyor being provided with a series of increasing pitches; a solids supply pipe connected to the cylinder near the base thereof; a liquid supply pipe connected to the cylinder adjacent the position of connection of the solids supply pipe with the cylinder; and a discharge pipe connected to the cylinder near the head thereof.

11. Apparatus in accordance with claim 10, including means for thermostatically heating the cylinder of the pre-treater.

12. Apparatus for the continuous extraction from solids of liquid solubles of high concentration and uniform composition comprising: a stationary cylinder mounted at an angle of at least 30 degrees; a rotatable screw conveyor housed within the cylinder, said screw conveyor being provided with a series of increasing pitches and a series of retarders; a solids supply pipe connected to the cylinder near the base thereof; a solids discharge pipe connected to the cylinder near the head thereof; a liquid supply pipe connected to the cylinder near the head thereof, said supply pipe being connected with means for supplying the liquid at constant pressure and at constant temperature; a removable porous section located on the underside of the cylinder and positioned near the bottom thereof, the said porous section being of mesh sufficient to retain the said solids, the said section being swept by the screw conveyor, and said porous section being spaced from the solid supply pipe forwardly thereof, whereby the solids are maintained in a dry zone anteriorly of said porous section; a liquid discharge pipe connected with the porous section; and means for maintaining the cylinder at a constant temperature.

13. Apparatus for the continuous extraction from solids of liquid solubles of high concentration and uniform composition comprising: a stationary cylinder mounted at an angle of at least 30 degrees; a rotatable screw conveyor housed within the cylinder, said screw conveyor being provided with a series of increasing pitches, a series of retarders and a removable clean-out pipe; a solids supply pipe connected to the cylinder near the base thereof; a solids discharge pipe connected to the cylinder near the head thereof; a liquid supply pipe connected to the cylinder near the head thereof, said supply pipe being connected with means for supplying the liquid at constant pressure and at constant temperature; a removable porous section located on the underside of the cylinder and positioned near the bottom thereof, the said porous section being of mesh sufficient to retain the said solids, the said section being swept by the screw conveyor, and said porous section being spaced from the solid supply pipe forwardly thereof, whereby the solids are maintained in a dry zone anteriorly of said porous section; a liquid discharge pipe connected with the porous section; and means for maintaining the cylinder at a constant temperature.

MAX WEISS.
SAMUEL NATELSON.

REFERENCES CITED

The following references are of record in the file of this patent:

UNITED STATES PATENTS

| Number | Name | Date |
| --- | --- | --- |
| 686,689 | Eswege | Nov. 12, 1901 |
| 731,028 | Eswege | June 16, 1903 |
| 930,909 | Wiegand | Aug. 10, 1909 |
| 959,448 | Boxter | May 31, 1910 |
| 1,244,884 | Nagelvoort | Oct. 30, 1917 |
| 1,534,737 | Reed | Apr. 21, 1925 |
| 1,565,283 | Mabee | Dec. 15, 1925 |
| 1,665,728 | Canright | Apr. 10, 1928 |
| 1,813,575 | Janecke et al. | July 7, 1931 |
| 2,084,839 | Debois | June 22, 1937 |
| 2,183,837 | Hamilton et al. | Dec. 19, 1939 |
| 2,309,139 | Rector | Jan. 26, 1943 |
| 2,381,965 | Berry | Aug. 14, 1945 |
| 2,404,884 | Piepper | July 30, 1946 |
| 2,405,105 | Kennedy | July 30, 1946 |
| 2,427,388 | Curran | Sept. 16, 1947 |

FOREIGN PATENTS

| Number | Country | Date |
| --- | --- | --- |
| 19,259 | Holland | Jan. 15, 1929 |
| 77,877 | Sweden | Mar. 30, 1932 |
| 529,311 | Great Britain | Nov. 19, 1940 |
| 621,576 | Germany | Nov. 9, 1935 |